United States Patent
Noh et al.

(10) Patent No.: US 7,437,054 B2
(45) Date of Patent: Oct. 14, 2008

(54) APPARATUS AND METHOD FOR CONTROLLING REVERSE-PLAY FOR DIGITAL VIDEO BITSTREAM

(75) Inventors: Kyung-Heon Noh, Suwon-si (KR); She-Woong Jeong, Seoul (KR); Jae-Hong Park, Sungnam-si (KR); Kyoung-Mook Lim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 916 days.

(21) Appl. No.: 10/859,838

(22) Filed: Jun. 3, 2004

(65) Prior Publication Data

US 2004/0252970 A1 Dec. 16, 2004

(30) Foreign Application Priority Data

Jun. 11, 2003 (KR) .................. 10-2003-0037677

(51) Int. Cl.
*H04N 5/76* (2006.01)
*H04N 7/26* (2006.01)

(52) U.S. Cl. ........................................ 386/68; 386/111

(58) Field of Classification Search ............... 386/1, 386/45–46, 68, 111, 125–126
See application file for complete search history.

(56) References Cited

U.S. PATENT DOCUMENTS

| 5,739,862 | A | * | 4/1998 | Cen | ................ 375/240.15 |
| 5,742,347 | A | | 4/1998 | Kandlur et al. | |
| 6,201,927 | B1 | * | 3/2001 | Comer | ................ 386/68 |
| 6,473,558 | B1 | * | 10/2002 | Wu et al. | ................ 386/68 |
| 2002/0051621 | A1 | * | 5/2002 | Cuccia | ................ 386/68 |
| 2002/0106589 | A1 | | 8/2002 | Rodney et al. | |

* cited by examiner

*Primary Examiner*—Thai Tran
*Assistant Examiner*—Nigar Chowdhury
(74) *Attorney, Agent, or Firm*—F. Chau & Associates, LLC (57) ABSTRACT

An apparatus and method of controlling a digital video (MPEG) player for reverse-play. The MPEG player is comprised of an I-frame buffer for storing I-pictures encoded from P-pictures by a video decoder, a B-frame buffer for storing B-pictures, and an I-frame encoder for decoding a P-picture into an I-picture. In the MPEG player, a picture group being played at present is decoded for reverse play and a previous picture group is decoded for preparation of the reverse-play. Reverse-play in soft 1-times (×1) by means of a frame memory of small capacity is achieved irrespective of the picture number and classes in picture groups.

12 Claims, 8 Drawing Sheets

APPARATUS AND METHOD FOR CONTROLLING REVERSE-PLAY FOR DIGITAL VIDEO BITSTREAM

CROSS-REFERENCE TO RELATED APPLICATIONS

This U.S. non-provisional patent application claims priority under 35 U.S.C. § 119 of Korean Patent Application 2003-0037677 filed on Jun. 11, 2003, the entire contents of which are hereby incorporated by reference.

BACKGROUND OF THE INVENTION

The present invention relates to MPEG video players, and more particularly to apparatuses and methods of controlling buffers for reverse-play of MPEG video streams.

Generally, MPEG video players are configured to carry out operations of normal-play and reverse-play, in which compressed video bitstreams are provided from a digital video data storage media such as a digital video disc (DVD) or digital video recorder (DVR). DVRs include a hard disk drive and a large capacity memory.

According to the MPEG standard established by the International Organization of Standardization (ISO), MPEG video bitstreams are composed of a multiplicity of frame groups divided into intra-coded frames (I-frames), predictive-coded frames (P-frames), and bidirectionally predictive-coded frames (B-frames). The I-frames are independently coded and are the least efficiently coded of the three frame types. The P-frames are coded more efficiently than are the I-frames and are coded relative to the preciously coded I- or P-frame. The B-frames are coded the most efficiently of the three frame types and are coded relative to both the previous and the next I- or P-frames.

The video bitstreams in MPEG systems include more than one group of pictures (GOP), each of which is composed of a multiplicity of pictures (or frames). The picture groups are accessed in accordance with a reproducing order from the encoded I-frames to the P- or B-frames relative to the I-frames.

A typical method of reverse-play in a MPEG video player involves decoding bitstreams backwards from the reproducing order of a normal MPEG coded video bitstream. In reverse-play, it may be most desirable to reproduce the bitstreams in the direction opposite to the normal output order. However, there are practical limits to the P- or B-frames being reproduced completely unless the I-frames are not reproduced as reference frames for the associated frames (P or B).

One example of reverse-play technique for MPEG video bitstreams is proposed in Japanese Patent Application No. 06-262030 dated Sep. 29, 1994 (Japanese Publication No. 08-102913). The Japanese Application proposes decoding and playing back encoded video bitstreams in a backward order from the encoded order.

Figure 1:
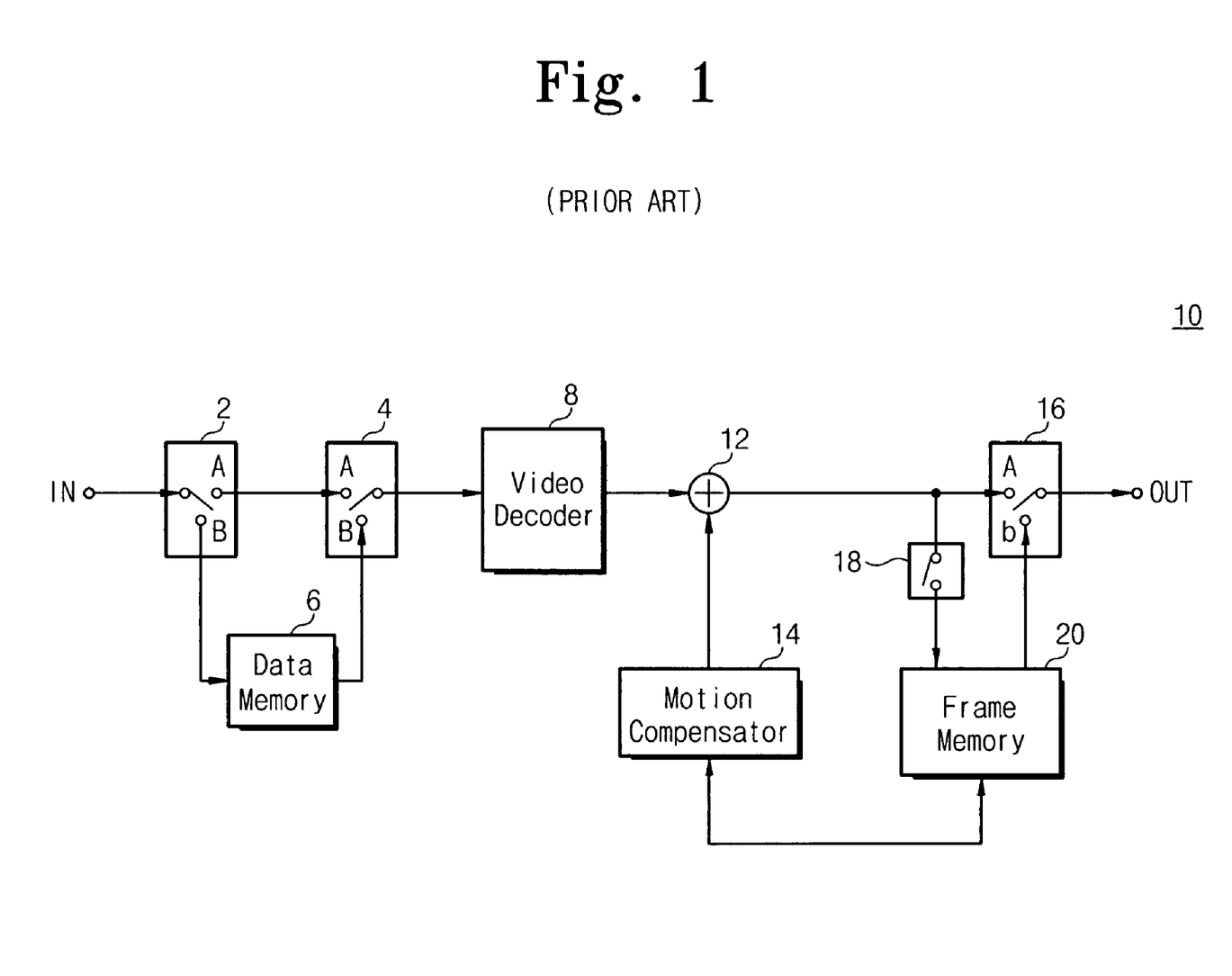
FIG. 1 is a block diagram of a conventional MPEG player useable for reverse-play of video streams.

Referring to FIG. 1, a conventional MPEG player 10 includes two switch circuits 2 and 4 and a data memory 6 at its input side. When the switch circuits 2 and 4 are connected at terminals A, an input data IN is connected to a video decoder 8. When the switch circuits 2 and 4 are connected at terminals B, the input data IN is written into and read from the data memory 6. In a reverse-play mode, the video decoder 8 decodes each frame and utilizing the data memory 6 and the frame memory 20, outputs a reverse-play video data OUT. The data OUT is output in a backward direction of bitstream order. The pictures of each group are input in the forward direction and reversely played.

In more detail, when an I-picture is entered into the MPEG player 10, the switch circuits 2 and 4 are switched to terminals A and a switch circuit 18 is closed. As a result, the I-picture is decoded by the video decoder 8 and then a reproduced I-picture data from the video decoder 8 is written into the frame memory 20. When a P-picture is input in the same connection states of the switch circuits 2, 4, and 18 with the case of the I-picture, the P-picture is decoded by the video decoder 8. Then, a differential image data decoded by the video decoder 8 and a motion vector data relative to the P-picture are applied to an adder 12. The motion vector data is provided from a motion compensation circuit 14. In this way, the frame memory 20 receives a predictive image data and a reproduced image data of the P-picture for storage. The predictive image data is obtained by the motion compensation circuit 14, which is being used to obtain a reproduced P-picture data prior by one frame to a currently input P-picture or a reproduced I-picture data (e.g., the first P-picture among the group of pictures "GOPs") by applying a frame selection data to the frame memory 20. The reproduced image data of the P-picture is added to the decoded differential image data at the adder 12.

When a B-picture is input, the switch circuits 2 and 4 are connected to their terminals B to transfer B-pictures among each GOP to the data memory 6.

Thus, the MPEG video player 10 employs the data memory 6 at the front of the video decoder 8 for performing reverse-play operation. The I- and P-pictures are written into or read from the frame memory 20, while the B-picture is written into or retrieved from the data memory 6 in a first-in last-out (FILO) fashion. The B-picture read from the data memory 6 is decoded and put into a motion compensation process with reference to the I-picture or the P-picture, and used as a reference frame corresponding to the decoded B-picture read from the memory 20. After completing the process of motion compensation for the B-picture, the pictures are reversely reproduced in their corresponding GOPs in sequence.

However, in the conventional MPEG player 10, reverse-play can only be performed for picture groups that have the same number of pictures. If there exists irregular numbers of pictures, information about a previous picture group is mismatched during reverse-play.

Further, in the conventional MPEG playing system, the I- and P-pictures used as reference frames are stored in the frame memory 20 in the form of raw data (YUV) while B-pictures are stored in compressed form. The pictures in proper numbers are read out from the data memory 6 to the reference frame and pictures of a previous GOP are rewritten into the read-out position of the data memory 6. During reverse-play mode, when a current picture group is read out downwardly from the top to the bottom in the frame buffer, the next picture group is read out upwardly from the bottom to top in the sequence of first-in last-out (FILO). However, if the picture groups are different from each other in the number of pictures, it is impossible to conduct the reverse-play operation by such manner. And, as two pictures are read out for one reference frame, it is also impossible to conduct the reverse-play operation when their structures of the picture groups are different and there are continuous reference pictures.

Accordingly, a need exists for a MPEG playing system which is capable of reverse-play for video bitstreams composed of picture groups with irregular picture numbers and/or types.

SUMMARY OF THE INVENTION

An apparatus is provided for controlling reverse-play of a video bitstream, comprising a picture divider for classifying the video bitstream into intra-coded pictures, predictive-coded pictures, and bidirectional predictive-coded pictures, the video bitstream having a plurality of picture groups; a first frame buffer for storing the bidirectional predictive-coded pictures; a video decoder for decoding the predictive-coded pictures; a frame memory for storing the decoded predictive-coded pictures output from the video decoder; an intra-frame encoder for encoding the decoded predictive-coded pictures into an intra-coded picture format; a second frame buffer for storing the intra-coded pictures and the encoded intra-coded pictures; and a buffer controller for outputting the pictures stored in the first and second frame buffers to the video decoder in accordance with pointing information about the pictures stored in the first and second frame buffers; wherein during a reverse-play operation, a current-playing picture group is read out from the first and second frame buffers and the frame memory and then decoded, while a previous picture group of the current-playing picture group is received in a normal play direction and then decoded.

The video decoder processes the pictures stored in the first and second frame buffers in sub group units corresponding to the pointing information, each sub group including a reference picture that is associated with the pointing information.

In one embodiment, wherein the first and second frame buffers are configured to correspond with the maximum picture number of the picture group.

In another embodiment, the first and second frame buffers, and the frame memory are configured in eighteen, five, and five units, respectively, when the number of the pictures in the picture group is eighteen.

Preferably, the decoded predictive-coded pictures are encoded to have the same bit ratio as that of a first one of the intra-coded pictures of the picture group. The buffer controller processes a 1-time reverse-play operation.

A method is also provided for controlling first and second buffers for a reverse-play operation with a digital video bitstream in a MPEG system including a frame memory and a video decoder, comprising the steps of classifying the digital video bitstream having a plurality of picture groups into intra-coded pictures, predictive-coded pictures, and bidirectional predictive-coded pictures; decoding the predictive-coded pictures; storing the bidirectional predictive-coded pictures and the decoded predictive-coded pictures in the first frame buffer and the frame memory; encoding the decoded predictive-coded pictures into an intra-coded picture format; storing the intra-coded pictures and the encoded intra-coded pictures; and outputting the pictures which have been stored in the first and second frame buffers to the video decoder in accordance with pointing information about the pictures stored in the first and second frame buffers, wherein during a reverse-play operation, a current-playing picture group is read out from the first and second frame buffers and the frame memory and then decoded, while a previous picture group of the current-playing picture group is received in a normal play direction and then decoded.

The pictures stored in the first and second frame buffers are processed in sub group units corresponding to the pointing information, each sub group including a reference picture that is associated with the pointing information.

The decoded predictive-coded pictures are encoded to have the same bit ratio as that of a first one of the intra-coded pictures of the picture group.

BRIEF DESCRIPTION OF THE DRAWINGS

The accompanying drawings illustrate exemplary embodiments of the present invention and, together with the description, serve to explain principles of the present invention. In the drawings:

FIGS. 5A and 5B illustrate a configuration of using a frame buffer and a frame memory during a reverse-play of an input video stream in accordance with an embodiment of the present invention;

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the invention to those skilled in the art. Like numerals refer to like elements throughout the specification.

Figure 2:
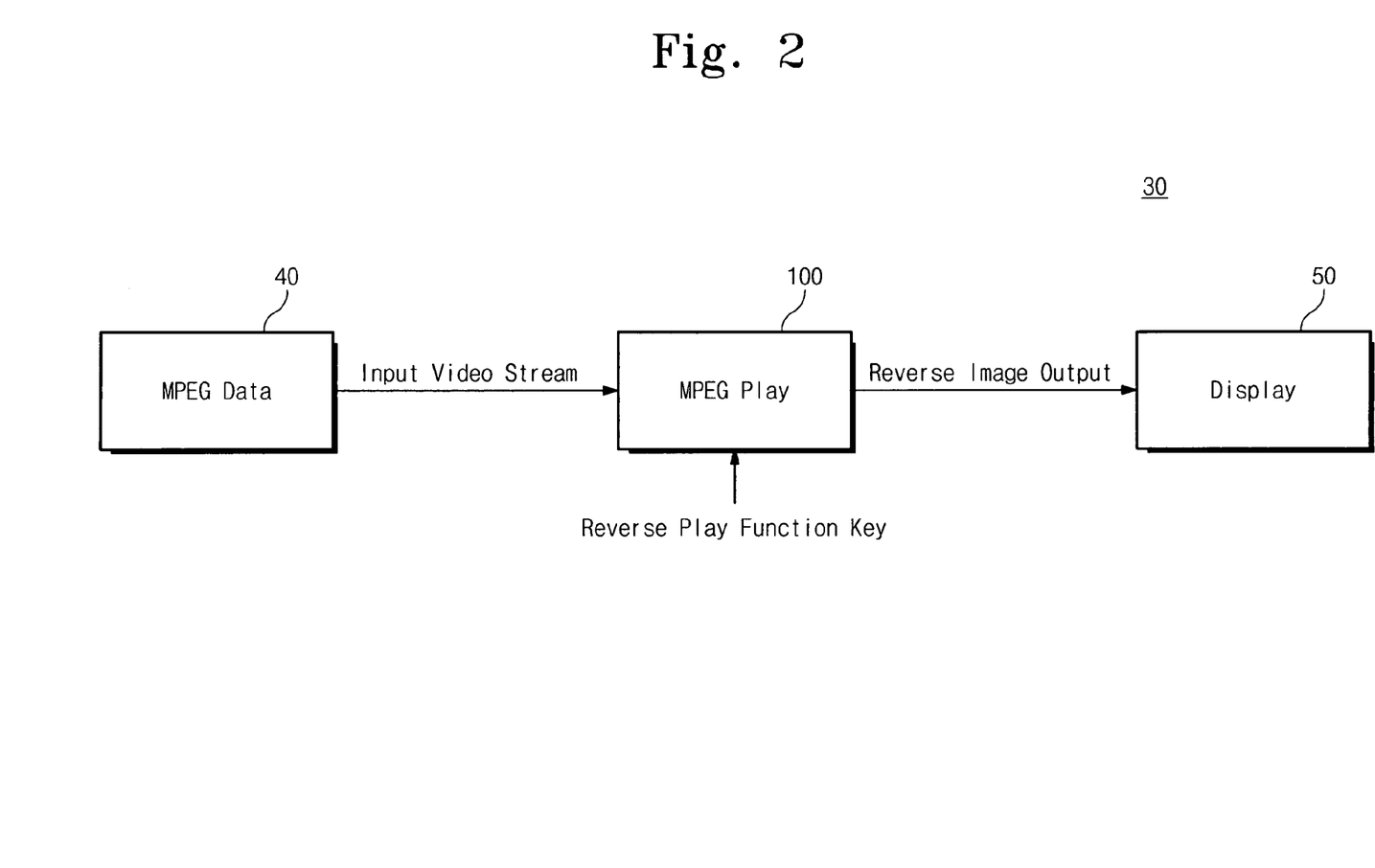
FIG. 2 is a block diagram of a MPEG video play system according to the present invention.

FIG. 2 is a block diagram of an MPEG system according to an embodiment of the present invention. Referring to FIG. 2, in the MPEG system 30, an MPEG video data storage medium 40 provides compressed video bitstreams to an MPEG player 100. The compressed video bitstreams are restored by the MPEG player 100 and then output to the display unit 50. If a reverse-play function key is active, the MPEG player 100 reproduces a currently played video bitstream to reverse image output data in accordance with the order of reverse-play and then sends them to the display unit 50.

Figure 3:
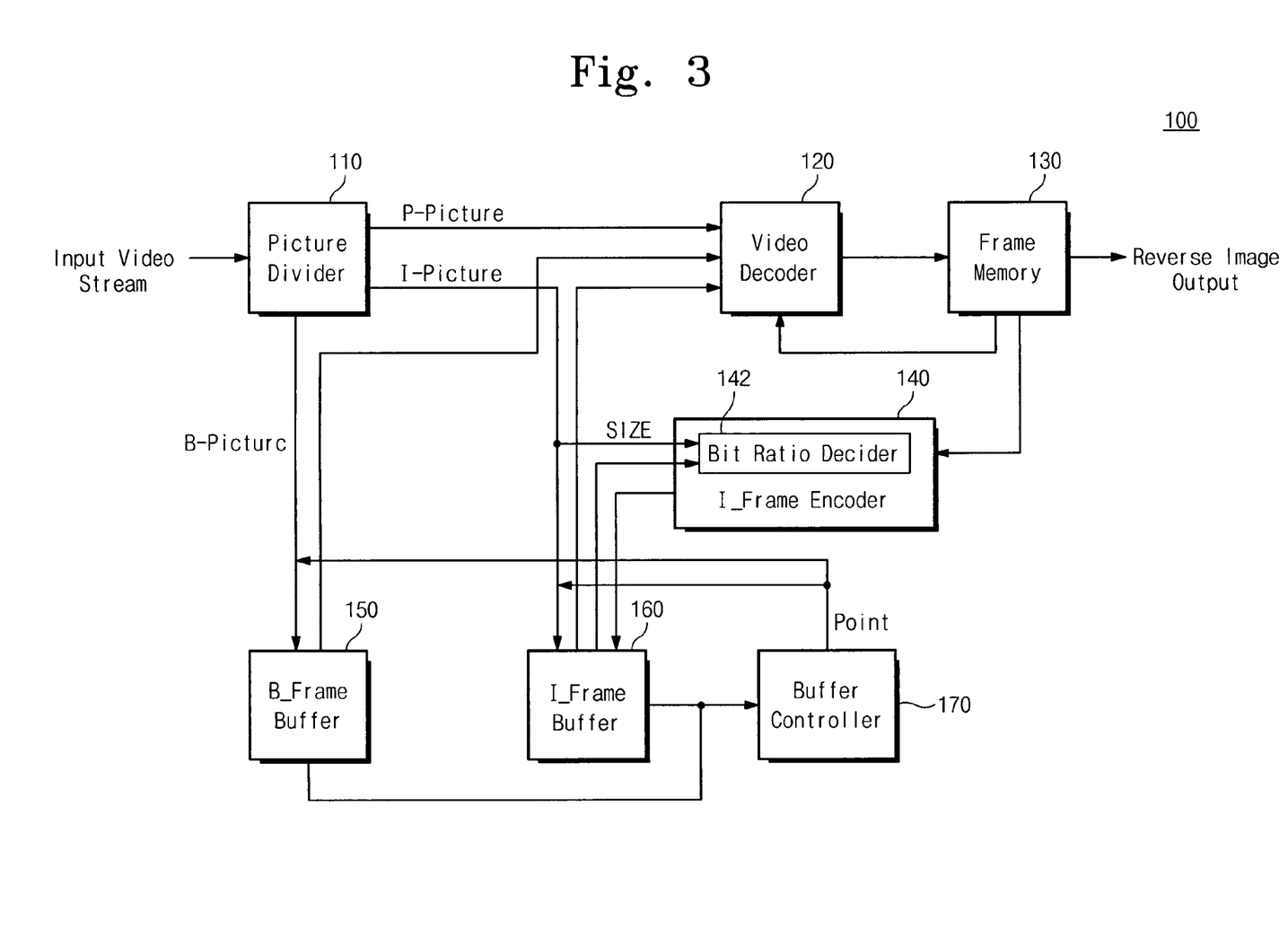
FIG. 3 is a block diagram of an MPEG player according to an exhibit of the present invention.

FIG. 3 shows a block diagram of the MPEG player 100 for a reverse-play operation shown in FIG. 2. Referring to FIG. 3, the MPEG player 100 is comprised of a B-frame buffer 150, an I-frame buffer 160, a buffer controller 170, a video decoder 120, and an I-frame encoder 140. A picture divider 110 and a frame memory 130 are also included within the MPEG player 100.

The picture divider 110 outputs I-, B-, and P-pictures extracted from an input video bitstream. The I-pictures are provided into the I-frame buffer 160 and the I-frame encoder 140, while the B-pictures are provided to the B-frame buffer 150. The P-pictures are transferred to the video decoder 120.

The B-frame buffer 150 stores the B-pictures supplied from the picture divider 110. The I-frame buffer 160 stores the I-pictures supplied from the picture divider 110 and I-pictures converted from the P-pictures. Here, the B- and P-pictures are stored in compressed form.

The video decoder 120, e.g., an MPEG decoder, decodes the input video bitstreams for playing and then sends the decoded bitstreams into the frame memory 130. During a reverse-play mode in accordance with the present invention, the video decoder 120 decodes the P-pictures and sends the decoded P-pictures to the frame memory 130. MPEG decoders are well known to those skilled in the art.

The frame memory 130 transfers the decoded video bitstreams, provided by the video decoder 120 to the display unit 50 in sequence. In a reverse-play mode, video bitstream provided from the video decoder 120 for the reverse-play is stored in the frame memory 130 and then transferred to the display unit 50 in sequence. During this, the decoded P-pictures are applied to the I-frame encoder 140 from the frame memory 130 for the reverse-play.

The I-frame encoder 140 encodes the decoded P-pictures supplied from the frame memory 130. The I-frame encoder 140 has a bit ratio decider 142 to determine a bit ratio corresponding to size information of the I-picture on the decoded P-picture. The decoded P-picture is encoded to an I-picture type with reference to the determined bit ratio, and then the encoded result is output to the I-frame buffer 160. Within the same picture group, the P-picture is encoded with a target bit ratio corresponding to the size information of a heading I-picture. The reason the target bit ratio of the picture input into the I-frame encoder 140 is decided with reference to the size of the heading I-picture is because the probability of occurrence with a remarkable image transition is low in a picture group, as well as because pictures in a picture group are similar in complexity. In other words, as re-encoding the P-picture into the I-picture is encoding a similar image into the I-picture form, it is possible to obtain an efficient target bit ratio by utilizing the size information of the I-picture ahead of its picture group without additional processes or evaluation steps.

The buffer controller 170 generates a pointing information signal POINT to enable the B- and I-pictures, which are respectively stored in the B-frame buffer 150 and the I-frame buffer 160, to be output to the video decoder 120 therefrom in the order of reverse-play. The pointing information signal POINT is used as information for indexing the order of reverse-play, by which each picture group is rearranged with sub groups, each including one reference picture, and the reverse-playing sequences for the reference pictures of the sub groups are managed to efficiently conduct a reverse-play mode for pictures groups which are different from each other in the number and types of pictures. Therefore, the I-pictures or the B-pictures are provided to the video decoder in sequence in accordance with the pointing information, and then the video decoder outputs decoded I- or B-pictures to be provided into the frame memory.

In the MPEG player 100, if the previous picture group is arranged in the frame memory, an input video stream is introduced thereinto in the types of I-, B-, and P-pictures. The I-picture is stored in the I-frame buffer 160 without passing through the video decoder 120. The P-picture is stored in the I-frame buffer 160 after passing through the video decoder 120, the frame memory 130, and the I-frame encoder 140, in sequence. The B-picture is stored in the B-frame buffer 150 directly from the picture divider 110.

For a picture group being played, pictures are stored in the B-frame buffer 150 nd the I-frame memory 130. Therefore, for currently playing picture group, pictures are read out from the B-frame buffer 150, the I-frame buffer 160, the frame memory 130, then decoded, and reversely played, by means of the buffer controller 170.

In addition, to implement the soft 1-times (×1) reverse-play, a picture group just prior to a picture group currently being played must be ready for the reverse-play. Thus, in performing a reverse-play for the currently playing picture group, the previous picture group needs to be decoded. That means it is required of a frame buffer capable of storing the maximum number of pictures in a picture group, with which the 1-times reverse-play is realized by playing the pictures in the sequence opposite to that of storing therein. Here, the frame buffer is controlled to save memory space of the frame buffer. Pictures ready for the reverse-play in the frame buffer are read out therefrom by the video decoder in the reverse sequence thereof, and the position of the frame buffer, from which the pictures have been read out, is filled with new pictures provided from the previous picture group.

Figure 4:
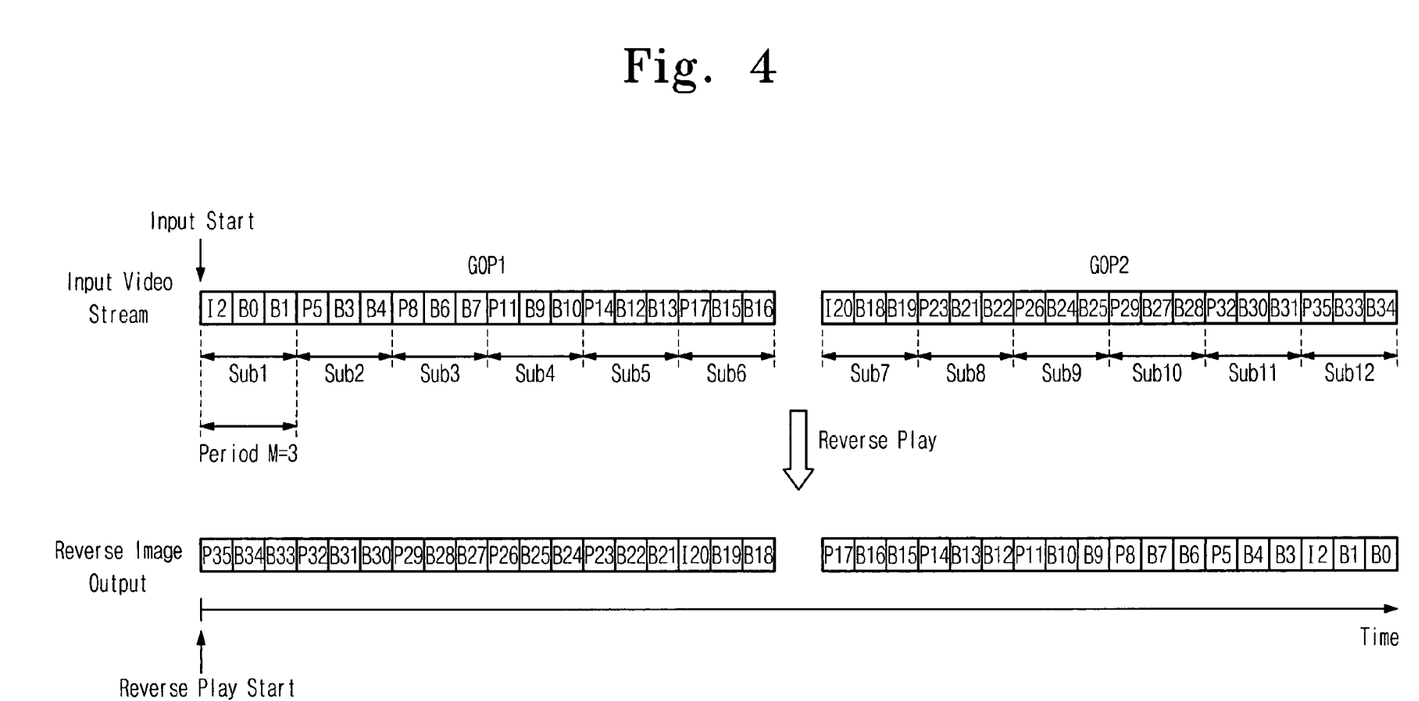
FIG. 4 illustrates structures of video streams for an input and reverse-play.

FIG. 4 illustrates structures of an input video bitstream provided from the digital video data storage media shown in FIG. 5 and a reverse-playing image output data. Each picture group (GOP) has a number of pictures. As an example, there is a maximum of 18 pictures in each GOP of a DVD video disc.

Referring to FIG. 4, either the input video bitstream or the reverse-playing image output data is composed of two picture groups GOP1 and GOP2. The picture groups are divided into a plurality of sub picture groups SUB1~SUB 12 in a predetermined picture cycle M, each picture group being composed of 6 sub groups. Here, the picture cycle M is 3, each sub picture group is formed of one I-picture or one P-picture, and two B-pictures.

As illustrated in FIG. 4, the input video bitstream is entered into the MPEG player 100 in accordance with the sequence of transmission. When a reverse-play function key is activated, the reverse image output data is provided into the display unit. The MPEG player 100 decodes and reverse-plays the picture group GOP2 introduced at present in accordance with the sequence of reverse-play, contemporaneously decoding the picture group GOP1 (the previous picture group) that has been input earlier than GOP2.

If there exists irregular structures in the picture groups in the MPEG video bitstream, i.e., different numbers of pictures or various picture types in the picture groups, soft reverse-play cannot be accomplished without controlling the frame buffers dynamically and adaptively thereto in accordance with the structural varieties.

Figure 5B:
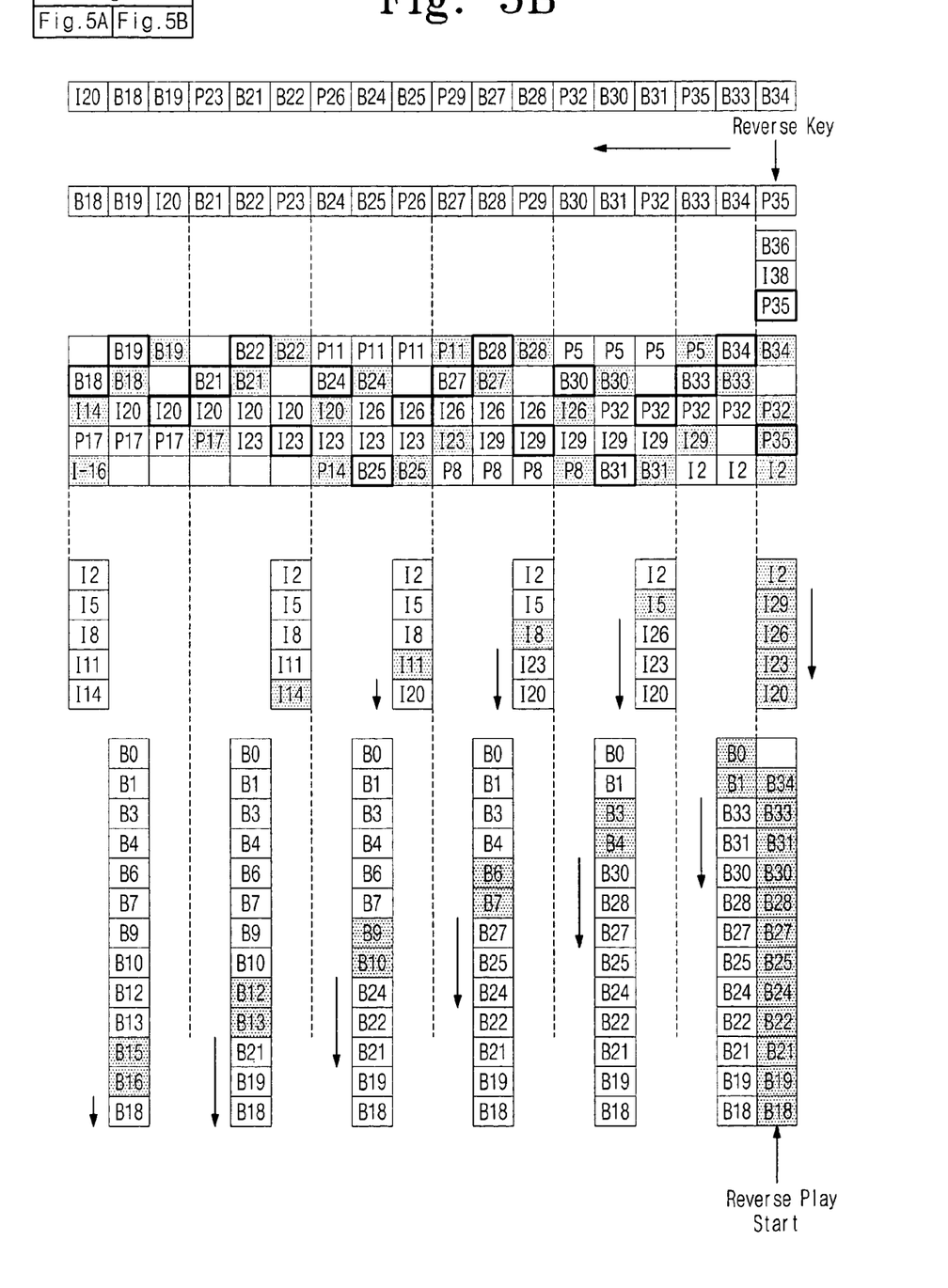

FIGS. 5A and 5B illustrate a method of controlling the frame buffers in a dynamic mode. Configurations of writing and reading with the I- and B-frame buffers and the frame memory during a reverse-play operation in the MPEG player according to an embodiment of the present invention are shown. This embodiment is applicable in the case that the picture groups have the same picture numbers and regular picture classes. The input video bitstream in FIG. 5 is composed of two picture groups, each of which is formed of 18 pictures.

If one picture group is stored in the B- and I-frame buffers 150 and 160, a reverse-play operation is ready to begin. In the reverse-play operation, two picture groups are contemporaneously decoded, such that one of the picture group, stored in the frame buffers 150 and 160 and the frame memory 130 for reverse-play of the currently playing video, is decoded in reverse from the input sequence thereof. The other picture group is arranged in a forward direction, which is supplied from a storage medium such as a DVD medium or a hard disc. The reason of decoding cotemporaneous with the two picture groups is to prepare a reverse-play operation for a previous picture group, which is preliminarily input from a storage medium of video bitstream, while the currently playing picture group is read out from the frame buffer and the frame memory and decoded.

In efficiently controlling the frame buffers for a reverse-play mode, frames with forward directions, which are input from a storage medium of video bitstream for reverse-play, are stored in the B- and I-frame buffers in the upward direction from the bottom to the top. The reverse-play operation starts when one of picture groups is stored therein, and the sequence of playing is opposite to the sequence of storing. As the I- and B-frame buffers 160 and 150 are controlled by the pointing information of the buffer controller 170, reverse-play operation is accomplished even for picture groups having irregular picture numbers and classes.

The I-frame buffer 160, the B-frame buffer 150 and the frame memory 130 are associated with corresponding sizes of the picture groups. As illustrated in FIG. 5, the procedures of writing and reading pictures in conjunction with decoding and displaying operations for the reverse-play mode are associated with structures of video bitstreams supplied from a video storage medium and video bitstreams to be displayed during the reverse-play mode. The structure shown in FIGS. 5A and 5B include five frame memories, five I-frame buffers, and thirteen B-frame buffers.

The I-frame buffer 160 and the B-frame buffer 150 are comprised in correspondence with the maximum number of pictures. In this embodiment, the frame memory 130 is associated with five frame buffers, one of which is further provided to be used for the reverse-play operation.

If a reverse-play function key is activated while the last frame P35 of the second picture group is being played, the frames of the second picture group currently being played are read out from the frame buffers 150 and 160 and the frame memory 130 in the sequence of reverse-play and decoded. At the same time, the first picture group is stored in the frame buffers 150 and 160 and the frame memory 130 so as to be put into the reverse-play mode next to the second picture group. Therefore, after completing the reverse-play for the second picture group, the first picture group is read out from the frame memory 130 and a picture group prior to the first picture group is arranged for the reverse-play.

In operations of writing/reading the picture group in/from the frame memory 130 and the frame buffers 150 and 160, the currently playing picture group and a previous picture group are contemporaneously decoded. While the currently playing picture group is read out from the frame memory 130 and the frame buffers 150 and 160 and then decoded, the previous picture group is received from an external storage medium for subsequent reverse-play operation. In this embodiment, a frame rate is assumed at 30 frames per second and one picture group is composed of eighteen pictures. And, as aforementioned, the MPEG player 100 is comprised of five frame memories, thirteen B-frame buffers, and five I-frame buffers. In FIG. 5, the arrows indicating upward and downward directions denote the sequence of reading pictures by the video decoder 120 for the reverse-play operation.

Referring to FIG. 5B, I- and B-pictures in a currently playing picture group are stored in the frame memory 130, the B-frame buffer 150, and the I-frame buffer 160. Empty spaces of the frame memory and buffers, after reading out the pictures, are filled with new pictures, and the frame buffers 150 and 160 is operable with writing and reading in a FILO manner. The I-pictures of the currently playing picture group, I20, I23, I26, and I29, are stored in the I-frame buffer 160, while the B-pictures of the currently playing picture group, B18, B19, B21, B22, B24, B25, B27, B28, B30, B31, B33, and B34, are stored in the B-frame buffer 150, in sequence.

If the reverse-play function key is activated when a current playing picture is P35, the frame memory 130 stores P35 and P32 as a reference picture of P35. And, a first reference picture of the previous picture group, I2, is decoded and then stored in the frame memory 130. During this, the B-frame buffer 150 stores B0 and B1 which are grouped with I2 when B34 is decoded and displayed, and the frame memory 130 stores the decoded B33. When the B-picture B33 is being displayed, the I-picture I29 is stored in the frame memory 130 after being read out from the I-frame buffer 160 and decoded. Then, a second reference picture of the previous picture group, P5, is decoded and stored in the I-frame buffer 160.

When P-picture P32 is being displayed, B31 is read out from the B-frame buffer 150, decoded, and then stored in the frame memory 130. The P5 is read out from the frame memory 130 and encoded into I-picture I5 and stored in the I-frame buffer 160. The B-frame buffer 150 stores B3 and B4 in sequence, which are grouped with the I-picture I5. When P-picture P30 is being displayed, I26 is read out from the I-frame buffer 160, decoded, and then stored in the frame memory 130. During this, P8 of the previous picture group is decoded and stored in the frame memory 130. As a result, I29, B30 and B31 are grouped into a single sub picture group.

When the I-picture I29 is being displayed, P-picture P8 is read out from the frame memory 130 and encoded to I-picture I8 and stored in the I-frame buffer 160. The B-picture B28 is stored in the frame memory 130 after being read out from the B-frame buffer 150 and encoded. When B28 is being displayed, the frame memory 130 stores B27 and I26 while the B-frame buffer 150 stores B6 and B7 which are grouped with I8. When the B-picture B27 is being displayed, P11 and I23 of the previous picture group are decoded and stored in the frame memory 130.

When the I-picture I26 is being displayed, B25 is decoded and stored in the frame memory 130, while P11 is decoded into I-picture I11 and stored in the I-frame buffer 160. When the B-picture B25 is being displayed, B24 is decoded and stored in the frame memory 130. The B-frame buffer 150 stores B9 and B10 which are grouped with I11. Subsequently, when the B-picture B24 is being displayed, I20 is read out from the I-frame buffer 160 and then decoded, while p14 of the previous picture group is decoded and stored in the frame memory 130.

When I23 is being displayed, B22 is decoded and stored in the frame memory 130, while P14 is converted into an I-picture to be stored in the I-frame buffer 160. When the B22 is being displayed, B21 is decoded and stored in the frame memory 130, while B12 and B13 of the previous picture group are stored in the B-frame buffer 150. When the B21 is being displayed, P17 of the previous picture group is decoded and stored in the frame memory 130 to prepare the reverse-play for B18 and B19.

When I20 is being displayed, B19 is decoded and stored in the frame memory 130. When B19 is being displayed, B18 is decoded and B15 and B16 are stored in the B-frame buffer 150. While B16 is being displayed, I14 of the previous picture group is decoded and stored in the frame memory 130 for the reverse-play of the currently playing picture group, preparing the reverse-play for the previous picture group. At this time, a picture group prior to the current picture group by two picture group terms is arranged for the reverse-play. In other words, a first reference picture I (-16) of the second previous picture group is decoded and stored in the frame memory 130, while I14 is read out from the I-frame buffer 160 and decoded to be stored in the frame memory 130 to arrange the reverse-play for B15 and B16 of the precious picture group.

As aforementioned, a reverse-operation mode according to embodiments of the present invention provides a simultaneous function of arranging a previous picture group for subsequent reverse-play operation while a current picture group is being reverse-played.

As an example, during reverse-play for the previous picture group with reference to FIG. 5A, when P17 is being displayed, B16 is decoded while the I-picture I (-16) of the second previous picture group is decoded and stored in the I-frame buffer 160. The P-picture P17 is directly output from the frame memory 130 and then displayed. When B16 is being displayed, B15 is decoded and stored into the frame memory 130 while the beginning reference pictures B (-18) and B (-17) that belong to the second previous picture group are stored in the B-frame buffer 150. And, when B15 is being displayed, B15 is decoded while the next reference picture B (-13) of the second previous picture group and I11 of the previous picture group are decoded and stored into the frame memory 130.

When the I-picture is being displayed, P (-13) is decoded into an I-picture to be stored in the I-frame buffer 160 while B13 is decoded and stored in the frame memory 130. When B13 is being displayed, B12 is read out from the B-frame buffer 150 and decoded while B (-15) and B (-14) of the second previous picture group are stored in the B-frame buffer 150. When B12 is being displayed, B12 is read out from the frame memory 130 and I8 is read out from the I-frame buffer 160 and decoded, while P (-12) of the second previous picture group is decoded and stored in the frame memory 130.

When the P-picture P11 is being displayed, I11 is output from the frame memory 130 while B10 is read out from the B-frame buffer 150, decoded, and stored in the frame memory 130. During this, P (-10) is read out and decoded into an I-picture to be stored into the I-frame buffer 160. When the B10 is being displayed, B9 is read out from the B-frame buffer 150 and then decoded while B (-12) and B (-11) of the second previous picture group are stored in the B-frame buffer 150. Next, when B9 is being displayed, the B9 is read out from the frame memory 130 and I5 read from the I-frame buffer 160 is decoded and stored in the frame memory 130, while p (-7) of the second previous picture group is decoded and stored in the frame memory 130.

When the P-picture P8 is being displayed, I8 is read out from the frame memory 130, while B7 is read out from the B-frame buffer 150 and decoded to be stored in the frame memory 130. The P (-7) of the second precious picture group is encoded into an I-picture and then stored into the frame memory 130. When the B7 is being displayed, B6 is read out from the B-frame buffer 150 and decoded to be stored in the frame memory 130, while B (-9) and B (-8) of the second previous picture group are stored in the B-frame buffer 150. Continuously, when the B6 is being displayed, I2 of the previous picture group is read out from the I-frame buffer 160 and decoded to be stored in the frame memory 130, while P (-4) of the second previous picture group is decoded and stored in the frame memory 130.

When P5 is being displayed, B4 is read out from the B-frame buffer 150 and decoded to be stored in the frame memory 130, while P (-4) read out from the frame memory 130 is encoded into an I-picture and stored in the I-frame buffer 160. When the B4 is being displayed, B3 read out from the B-frame buffer 150 is decoded and stored in the frame memory 130, while B (-6) an B (-5) of the second previous picture group are stored in the B-frame buffer 150. And, when the B3 is being displayed, the B3 is read out from the frame memory 130, while P (-1) of the second previous picture group is decoded and stored in the frame memory 130.

When the I2 is being displayed, the I2 is read out from the frame memory 130, while B1 is read out from the B-frame buffer 150 and decoded to be stored in the frame memory 130. When the B1 is being displayed, the B1 is read out from the frame memory 130, while B0 is read out from the B-frame buffer 150 and decoded to be stored in the frame memory 130. During this, the B-frame buffer 150 stores B9-3) and B (-2) of the second previous picture group. In such way, reverse-play is accomplished for a third previous picture group.

Figure 6:
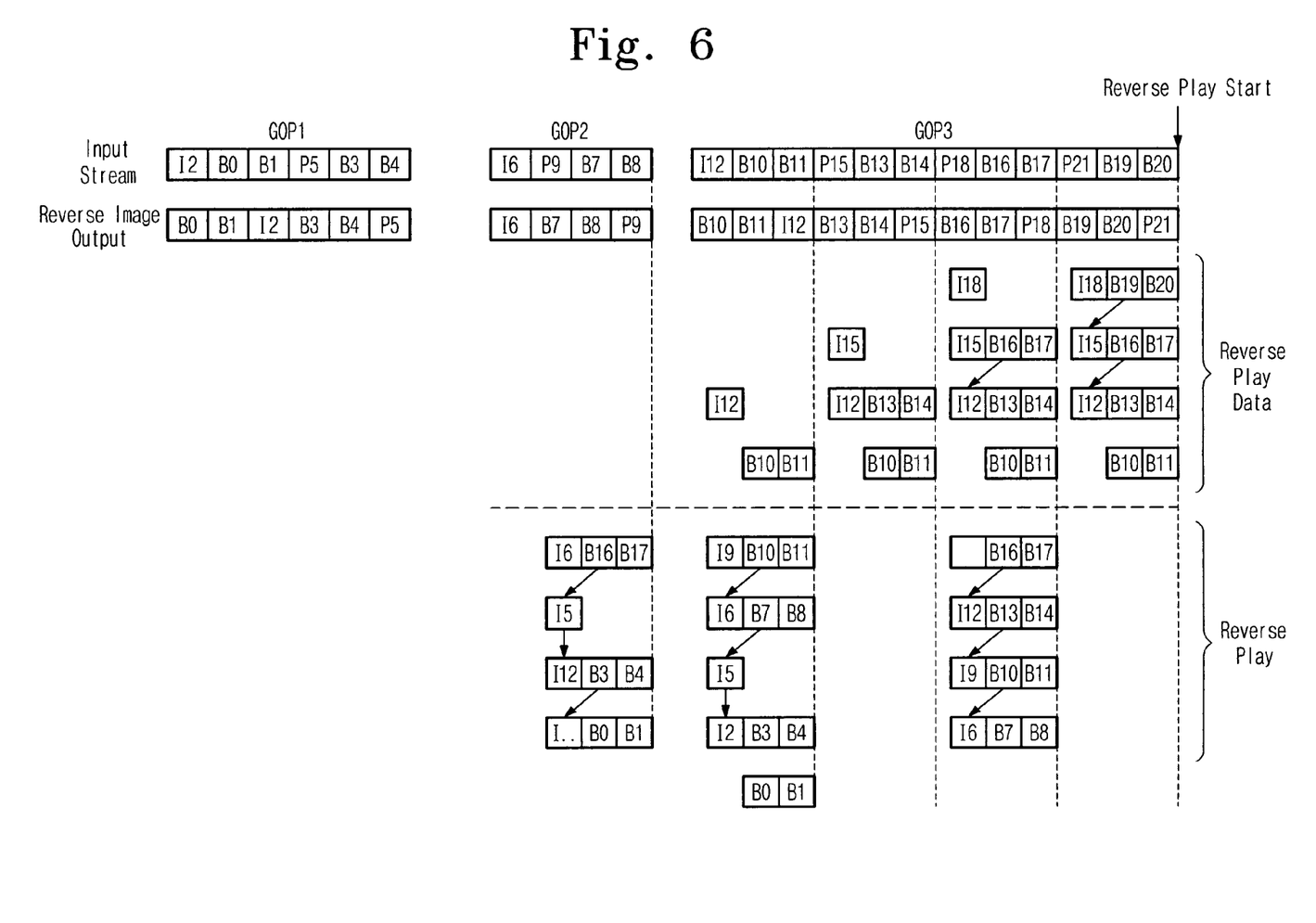
FIG. 6 illustrates a configuration of using the frame buffer and the frame memory during the reverse-play of an input video stream in accordance with another embodiment of the present invention.

Referring to FIG. 6, an input video bitstream includes first through third picture groups GOP1~GOP3 having different picture numbers and classes. The first picture group GOP1 has six pictures, the second picture group GOP2 has four pictures, and the third picture group GOP3 has twelve pictures. Further, the classes of the pictures throughout the groups GOP1~GOP3 are in irregular patterns.

When the reverse-play function key is activated during a playing mode, the picture divider 110 classifies an input video bitstream into B-pictures, P-pictures, and I-pictures. The B-pictures are stored in the B-frame buffer 150, while the I-pictures and encoded I-pictures from the P-pictures are stored in the I-frame buffer 160. The currently playing picture group GOP3 is read out from the frame buffers 150 and 160 and the frame memory 130, decoded, and then reproduced in the reverse-play mode, while the previous picture groups are decoded before the reverse-play subsequent thereto. During this, the MPEG player 100 processes the reverse-play operation and manage the orders of sub picture groups composed of a reference picture (i.e., a single I-picture), B-pictures, or simply a reference picture, through the buffer controller 170 when the pictures are stored in the frame buffers 150 and 160.

For instance, if there is an input of the reverse-play function key while B20 of the third picture group GOP3 is being played, a previous reference picture P18 is encoded into I18 to prepare a reverse-play operation for B20 and B19, forming a sub picture group with P18, B19, and B10. Similarly, P15 is decoded and grouped in a sub picture group to conduct a reverse-play operation for B16 and B17. As the buffer controller 170 manages the reverse-playing order of the grouped sub pictures, the reverse-play operation for the picture groups different in picture numbers and classes is performed.

As aforementioned, the MPEG player reads the pictures of the picture groups which are currently being played from the frame memory and decodes them in response to an activated reverse-play function key, at the same time, pictures of the previous picture groups are read and decoded and then stored in the frame buffers for preparing successive processes of the reverse-play operation. The classified I- and B-pictures are stored in the I-frame buffer and the B-frame buffer, respectively, while the P-pictures are decoded by the video decoder and then stored in the frame memory. Subsequently, the P-pictures are converted into I-pictures by the I-frame encoder and then stored in the I-frame buffer again. Here, the pictures stored in the frame buffers are grouped with a reference picture therein to be associated with pointing information for a sequential reverse-play operation by the buffer controller.

Then, the I- and B-pictures are read out and decoded by the video decoder, and grouped with their corresponding pictures and stored in the frame memory. As a result, the pictures stored in the frame memory are output as data to be used in the reverse-play operation.

Figure 7:
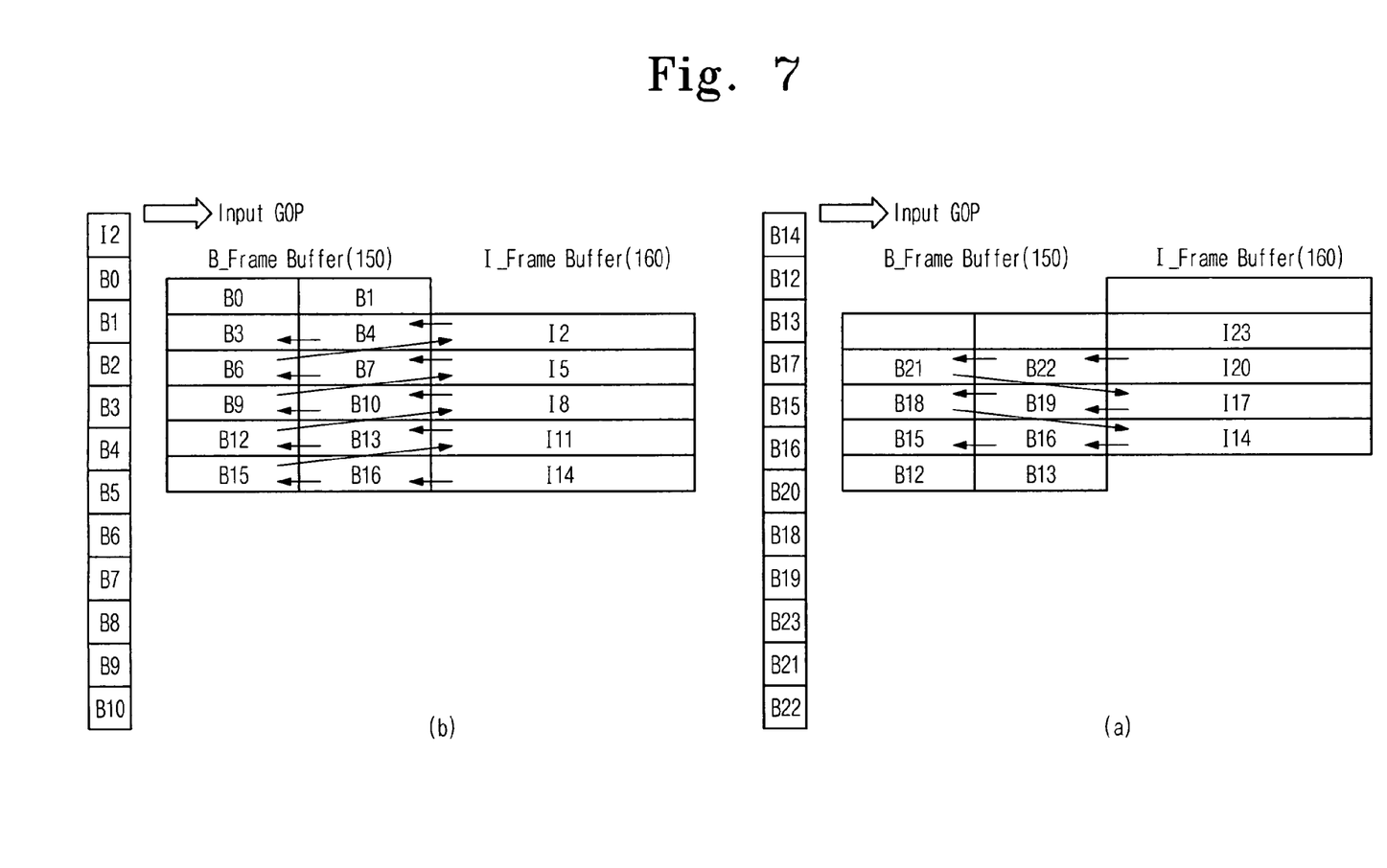
FIG. 7 illustrates a configuration of using the frame buffer with reference to a sequence of decoding grouped sub-pictures during a reverse-play according to an embodiment of the present invention.

FIG. 7 illustrates a configuration of using the frame buffer with reference to a sequence of decoding the grouped sub pictures during the reverse-play according to the present invention.

Referring to FIG. 7, the reverse-play is able to begin a first buffer state (a). On the sequence of the reverse-play, while the B-picture B20 is the first one to be displayed, the P-pictures P23 and P20 should be decoded because the B22 is the bi-directionally predictive coded picture. In other words, the converted picture I23 is first decoded and next the I20 is decoded. The arrows within the frame buffers in FIG. 7 denote the sequence of decoding.

An I-picture used as the reference picture on the decoding sequence is grouped with a B-picture subsequent to the next I-picture. As shown in FIG. 7, the B-pictures accompanying with the I-picture I14 are B16 and B15 consecutive to B17.

To process the picture groups having irregular picture numbers and classes without malfunction, linking of the decoding sequences for the pictures is arranged by means of the buffer controller shown in FIG. 1. The buffer controller 170 makes it possible to conduct the reverse-play operation for the picture groups having irregular picture numbers and classes by managing the decoding sequence of the reference pictures of the sub picture groups between corresponding pictures.

Further referring to FIG. 7, a sequential decoding operation with the frame buffers 150 and 160 under a second buffer state (b) is as follows.

At the beginning of a reverse-play mode, the MPEG player 100 reads a first picture of a picture group that is currently being played. In this embodiment and for illustration, it is assumed that I14 is the first picture to be stored in the frame buffers 150 and 160, being grouped with the B-pictures B16 and B15 subsequent to the next reference picture, and the buffer controller arranges the decoding sequence on I14—>B16—>B15. B12 and B13 are still not grouped at present because they will be grouped with the last reference picture of the previous picture group. The next B-picture P17 is transformed into I17 and then stored in the frame buffers 150 and 160 and grouped with B19 and B18. During this, the buffer controller 170 arranges the decoding sequence on I17—>B19—>B18—>I14—>B16—>B15. The other pictures consecutive thereto are stored and arranged in the same manner as shown in FIG. 7.

With such method of controlling the buffers, as the buffer controller 170 coupled the pointing information associated with the decoding sequences to the pictures even though new pictures are stored in specific positions of the frame buffers 150 and 160, reverse-play operations are accomplished irrespective of such irregular picture numbers and classes in the picture groups.

Moreover, even if a reference picture, not a B-picture, appears again after the next reference picture, a current reference picture is not grouped with its corresponding B-pictures but independently stored in the buffer and associated with a picture to be next decoded.

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

What is claimed is:

1. An apparatus for controlling reverse-play of a video bitstream, comprising:
    a picture divider for classifying the video bitstream into intra-coded pictures, predictive-coded pictures, and bidirectional predictive-coded pictures, the video bitstream having a plurality of picture groups;
    a first frame buffer for storing the bidirectional predictive-coded pictures;
    a video decoder for decoding the predictive-coded pictures;
    a frame memory for storing the decoded predictive-coded pictures output from the video decoder;
    an intra-frame encoder for encoding the decoded predictive-coded pictures into an intra-coded picture format;
    a second frame buffer for storing the intra-coded pictures and the encoded intra-coded pictures; and
    a buffer controller for outputting the pictures stored in the first and second frame buffers to the video decoder in accordance with pointing information about the pictures stored in the first and second frame buffers,
    wherein during a reverse-play operation, a current-playing picture group is read out from the first and second frame buffers and the frame memory and then decoded, while a previous picture group of the current-playing picture group is received in a normal play direction and then decoded.

2. The apparatus as set forth in claim 1, wherein the video decoder processes the pictures stored in the first and second frame buffers in sub group units corresponding to the pointing information, each sub group including a reference picture that is associated with the pointing information.

3. The apparatus as set forth in claim 1, wherein the first and second frame buffers are configured to correspond with the maximum picture number of the picture group.

4. The apparatus as set forth in claim 3, wherein the first and second frame buffers, and the frame memory are configured in eighteen, five, and five units, respectively, when the number of the pictures in the picture group is eighteen.

5. The apparatus as set forth in claim 1, wherein the decoded predictive-coded pictures are encoded to have the same bit ratio as that of a first one of the intra-coded pictures of the picture group.

6. The apparatus as set forth in claim 1, wherein the buffer controller processes a 1-time reverse-play operation.

7. A method of controlling first and second buffers for a reverse-play operation with a digital video bitstream in a MPEG system including a frame memory and a video decoder, comprising the steps of:
    classifying the digital video bitstream having a plurality of picture groups into intra-coded pictures, predictive-coded pictures, and bidirectional predictive-coded pictures;
    decoding the predictive-coded pictures;
    storing the bidirectional predictive-coded pictures and the decoded predictive-coded pictures in the first frame buffer and the frame memory;
    encoding the decoded predictive-coded pictures into an intra-coded picture format;
    storing the intra-coded pictures and the encoded intra-coded pictures; and
    outputting the pictures which have been stored in the first and second frame buffers to the video decoder in accordance with pointing information about the pictures stored in the first and second frame buffers,
    wherein during a reverse-play operation, a current-playing picture group is read out from the first and second frame buffers and the frame memory and then decoded, while a previous picture group of the current-playing picture group is received in a normal play direction and then decoded.

8. The method as set forth in claim 7, wherein the pictures stored in the first and second frame buffers are processed in sub group units corresponding to the pointing information, each sub group including a reference picture that is associated with the pointing information.

9. The method as set forth in claim 7, wherein the decoded predictive-coded pictures are encoded to have the same bit ratio as that of a first one of the intra-coded pictures of the picture group.

10. An apparatus for controlling reverse-play of a video bitstream, comprising:
    means for classifying the video bitstream into intra-coded pictures, predictive-coded pictures, and bidirectional predictive-coded pictures;
    means for storing the bidirectional predictive-coded pictures;
    means for decoding the predictive-coded pictures;
    means for encoding the decoded predictive-coded pictures into an intra-coded picture format;
    means for storing the decoded predictive-coded pictures, the intra-coded pictures and the encoded intra-coded pictures; and
    means for associating pointing information with the stored pictures; and
    means for reverse-playing a current-playing picture group while a previous picture group is received in a normal play direction and decoded.

11. The apparatus as set forth in claim 10, wherein the decoded predictive-coded pictures are encoded to have the same bit ratio as that of a first one of the intra-coded pictures of the picture group.

12. The apparatus as set forth in claim 10, further including means for processing a 1-time reverse-play operation.

* * * * *